A. B. Sprout,
Horse Rake.
No. 2032. Reissued July 18. 1865.
Fig. I
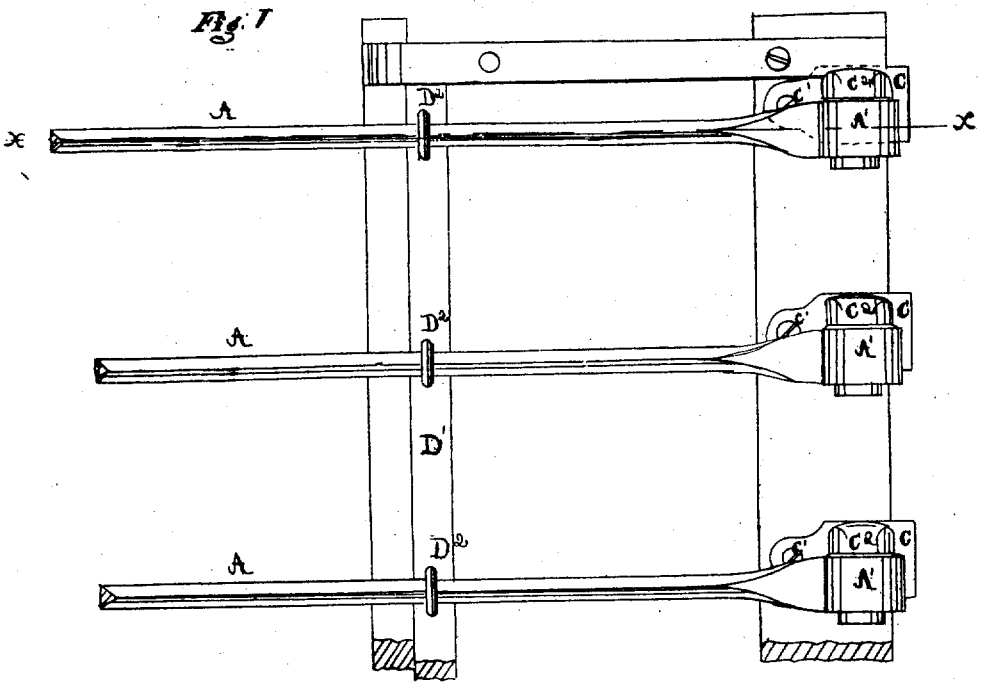
Fig. II.
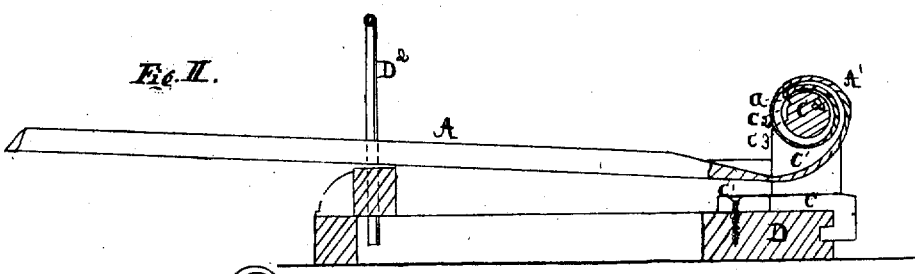
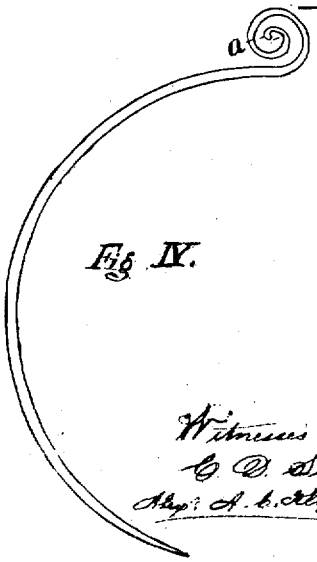
Fig. IV.
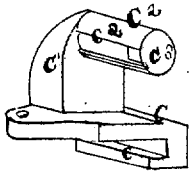
Fig. III.
Witnesses
C. D. Smith
Thos. A. L. Mauck
A. B. Sprout
By Munn & Co
Attorneys

UNITED STATES PATENT OFFICE.

ARIEL B. SPROUT, OF HUGHESVILLE, PENNSYLVANIA.

IMPROVEMENT IN HORSE-RAKES.

Specification forming part of Letters Patent No. 45,942, dated January 17, 1865; Reissue No. 2,032, dated July 18, 1865.

*To all whom it may concern:*

Be it known that I, ARIEL B. SPROUT, of Hughesville, in the county of Lycoming and State of Pennsylvania, have invented a new and useful Improvement in Horse-Rake Teeth, and in the manner of attaching the same; and I do hereby declare the following to be a full and exact description of the same, reference being had to the accompanying drawings, making part of this specification, in which—

Figure 1 is a plan of a portion of a rake illustrating my invention. Fig. 2 is a sectional elevation of the same, the section being taken in the line *x x*. Fig. 3 is a perspective view of my improved fastening device by which the tooth is attached to the frame. Fig. 4 is a view of one of my curved teeth.

Similar letters of reference indicate corresponding parts in the several figures.

This invention consists, first, in so forming the body of the tooth as to adapt it to withstand a much greater tensional strain; second, in an improved manner of imparting the necessary elasticity to the spring, and at the same time providing for its more ready attachment; third, in a device which admits of the attachment of the tooth without the employment of screws, nails, or other appliances.

In order that others skilled in the art to which my invention appertains may be enabled to fully understand and use the same, I will proceed to describe its construction and operation.

In the accompanying drawings, A A A may represent a series of teeth, which of course are designed to be curved in customary manner, as in Fig. 4. These teeth may be constructed in angular form, as represented, the volume of metal of which they are composed gradually increasing toward the inside or in the direction of the part to which the tensional force is applied. By constructing the body of the tooth in this manner it is manifest that it is made capable of withstanding a much greater strain than teeth containing the same amount of metal made round or in any other form hitherto given to the teeth of horse-rakes, for the reason that bodies begin to break at the weaker points, it being evident that the periphery of a round tooth affords a good starting-point for a break in the event of a forcible strain, whereas in my improved tooth the strain meets with the greatest resistance directly at the point at which the same would be most liable to commence to break—that is, where the strain is most vigorously applied.

My object is to construct the tooth so that the larger amount of metal shall be inside of a line drawn through the tooth, following its curvature, and equidistant between its inner and outer periphery. This general feature complied with, the conformation or outline of the teeth might vary so long as they fulfill the conditions of my claim, having a greater amount of metal on the inside of the central line of said teeth, midway between its inner and outer periphery. Each tooth A is drawn out so as to form in one piece therewith a flat spring, A′, which adapts the tooth to conform to the undulations of the ground, and to rise and pass over any obstacles with which it may come in contact. Besides imparting the requisite elasticity to the tooth, the spring A′ constitutes means for attaching the same, as will be presently explained.

C C C represent plates of metal, formed each with a flange, *c*, which is let into the frame D of the rake in the manner shown, thus rendering the respective plates C capable of being firmly secured in position by means of a single screw, *c′*.

If desired, a single mortise may be made in the frame D for the reception of each flange *c*; or, if desired, a single continuous groove may be made in the frame, in which the flanges of all the plates may be inserted.

Formed or cast in one piece with the respective plates C is a standard, C′, from and at right angles to which projects what may be termed a "cylindrical spool," $C^2$, the form of which is more clearly illustrated in Fig. 3. In each spool $C^2$ is formed a recess, $c^2$, and a slot or groove, $c^3$. The spring A′, being coiled in the manner represented in Fig. 2, is slipped over the spool $C^2$, so as to cause its end to occupy the recess $c^2$, which operation is greatly facilitated by the provision of the slot $c^3$, through which is passed the flanged or deflected end *a* of the spring A′. The end *a* of the spring A′, having entered the recess $c^2$, is moved upward therein, by the elasticity of the spring, as far as the limits of the recess will permit, when said spring A′ and tooth A are securely fastened in position, the tooth resting on the transverse bar D′ of the frame and confined by the ordinary staple, $D^2$.

Should it be necessary at any time to detach any one of the rake-teeth, this can be done by merely withdrawing the screw $c'$.

Rake-teeth of the above construction are simple as well as durable, may be employed with great advantage, and manufactured at little cost.

I am aware that it has been proposed to make rake-teeth of a tubular character, and, further, by the removal of a portion of the periphery or exterior longitudinally, to make them of a U shape, viewed in transverse section; but I do not claim either of these forms. My rake-tooth is so constructed with sides which are in the main of a trilateral character (unless by the removal of the angles the sides are merged into a curve) that a longitudinal section following the curve of the tooth and midway between the inner and outer lines of curvature of the tooth will not divide the tooth into more than two pieces—that is, it will cut through metal at all points from side to side of the tooth. This would not be the case were it of U-shaped form, as the two upper limbs (as the cross-section appears when shown thus, U) would be divided from the bow or lower portion and from each other partially or entirely, depending upon whether the U shape became merged into a more solid form at some other point. It is not my design that any curve in the sides of the tooth (viewed in cross-section) shall penetrate as far as the center of the circle circumscribing the said section; but it is my design that the widest portion of the tooth shall be inside of the line of section above described, and I intend the term "inside" to refer to that portion of the tooth which is on the inner side of the curve, viewing the tooth as a whole, in side elevation, as in its place in the machine of which it forms a part.

What I claim as new, and desire to secure by Letters Patent, is—

1. Independently of the shape of the sides, which are, however, in the main of a trilateral character, (viewed in cross-section,) unless by the removal of the angles the sides are merged into a curve, a tooth so constructed that on being divided by a longitudinal section which follows the curvature of the tooth at a point midway between the inner and outer lines of said curvature the greater amount of metal and the widest portion of the tooth shall be on the inner side of said curved section, substantially as above set forth and described.

2. In combination with a tooth having the above characteristics, a coiled spring by which it is attached to the head and by means of which its elasticity is increased.

3. The plate C C, adapted to be secured in position by the screw $c'$, substantially as and for the purpose specified.

4. The spool $C^2 c^2 c^3$, constructed and arranged substantially as described, and adapted for the attachment of the spring A′, in the manner set forth.

The above specification of my improvement in horse-rakes signed this 16th day of March, 1865.

A. B. SPROUT.

Witnesses:
CHARLES D. SMITH,
EDWARD H. KNIGHT.